United States Patent
Kakutani

(10) Patent No.: US 7,715,053 B2
(45) Date of Patent: May 11, 2010

(54) HALFTONE PROCESS GIVING SPECIFIED CHARACTERISTICS TO PARTICULAR DOT PATTERNS, AND GENERATING AND EVALUATING A DITHER MATRIX THEREFOR

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 813 days.

(21) Appl. No.: 11/521,232

(22) Filed: Sep. 13, 2006

(65) Prior Publication Data
US 2007/0058204 A1   Mar. 15, 2007

(30) Foreign Application Priority Data
Sep. 15, 2005   (JP) .............................. 2005-268996

(51) Int. Cl.
   H04N 1/405   (2006.01)
   H04N 1/032   (2006.01)
   B41J 2/205   (2006.01)
   B41J 2/15   (2006.01)

(52) U.S. Cl. ................ 358/3.06; 358/3.12; 358/3.16; 347/15; 347/41

(58) Field of Classification Search ................. 358/1.9, 358/3.02, 3.06, 3.09–3.17, 3.2, 3.21, 3.26, 358/534–536; 347/15, 41, 43
See application file for complete search history.

(56) References Cited
U.S. PATENT DOCUMENTS
6,504,625 B1 * 1/2003 Amero et al. ................. 358/1.9

(Continued)

FOREIGN PATENT DOCUMENTS
JP   07-081190   3/1995

(Continued)

OTHER PUBLICATIONS
Abstract of Japanese Patent Publication No. 07-081190, Pub. Date: Mar. 28, 1995, Patent Abstracts of Japan.

(Continued)

Primary Examiner—Scott A Rogers
(74) Attorney, Agent, or Firm—Martine Penilla & Gencarella, LLP

(57) ABSTRACT

A printing method for performing a halftone process on image data representing input tone values of pixels constituting an original image to determine dot formation on each print pixel of a print image to be formed on a print medium, generating dot data representing the determined dot formation, and forming a dot on each of the print pixels for generating the print image according to the dot data. The step of generating the print image includes mutually combining dots formed on print pixels belonging to each of a plurality of pixel groups in a common print area, the plurality of pixel groups having a physical difference at dot formation, the dot formation being performed with respect to each of the pixel groups. A plurality of pixel groups having a physical commonality for the dot formation among the plurality of pixel groups constitute a pixel group family. The halftone process is configured to give specified characteristics with a first dot pattern being formed on print pixels of the print image, a second dot pattern being formed on print pixels belonging to each of the plurality of pixel groups, and a third dot pattern being formed on print pixels belonging to the pixel group family.

10 Claims, 14 Drawing Sheets

U.S. PATENT DOCUMENTS

| | | | |
|---|---|---|---|
| 7,387,355 B2 * | 6/2008 | Kakutani | 347/15 |
| 2006/0193010 A1 * | 8/2006 | Kakutani | 358/3.13 |
| 2007/0058202 A1 * | 3/2007 | Kakutani | 358/3.06 |
| 2007/0091134 A1 * | 4/2007 | Kakutani | 347/15 |
| 2007/0216954 A1 * | 9/2007 | Kakutani | 358/3.06 |
| 2007/0258110 A1 * | 11/2007 | Kakutani et al. | 358/3.16 |
| 2008/0123147 A1 * | 5/2008 | Koase et al. | 358/3.13 |
| 2008/0123148 A1 * | 5/2008 | Takahashi et al. | 358/3.13 |
| 2008/0259361 A1 * | 10/2008 | Kakutani | 358/3.06 |

FOREIGN PATENT DOCUMENTS

| | | |
|---|---|---|
| JP | 07-177351 | 7/1995 |
| JP | 10-329381 | 12/1998 |

OTHER PUBLICATIONS

Abstract of Japanese Patent Publication No. 07-177351, Pub. Date: Jul. 14, 1995, Patent Abstracts of Japan.

Abstract of Japanese Patent Publication No. 10-329381, Pub. Date: Dec. 15, 1998, Patent Abstracts of Japan.

* cited by examiner

Fig.4

Matrix M (WEIGHTING: 4)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 1 | 0 | 1 | 0 | 1 | 0 | 1 |
| COLUMN 2 | 2 | 3 | 2 | 3 | 2 | 3 | 2 | 3 |
| COLUMN 3 | 0 | 1 | 0 | 1 | 0 | 1 | 0 | 1 |
| COLUMN 4 | 2 | 3 | 2 | 3 | 2 | 3 | 2 | 3 |
| COLUMN 5 | 0 | 1 | 0 | 1 | 0 | 1 | 0 | 1 |
| COLUMN 6 | 2 | 3 | 2 | 3 | 2 | 3 | 2 | 3 |
| COLUMN 7 | 0 | 1 | 0 | 1 | 0 | 1 | 0 | 1 |
| COLUMN 8 | 2 | 3 | 2 | 3 | 2 | 3 | 2 | 3 |

Matrix M01 (WEIGHTING: 2)

|  | 1 | 2 | 3 | 4 | 5 | 6 | 7 | 8 |
|---|---|---|---|---|---|---|---|---|
| 1 | 0 | 1 | 0 | 1 | 0 | 1 | 0 | 1 |
| 2 |  |  |  |  |  |  |  |  |
| 3 | 0 | 1 | 0 | 1 | 0 | 1 | 0 | 1 |
| 4 |  |  |  |  |  |  |  |  |
| 5 | 0 | 1 | 0 | 1 | 0 | 1 | 0 | 1 |
| 6 |  |  |  |  |  |  |  |  |
| 7 | 0 | 1 | 0 | 1 | 0 | 1 | 0 | 1 |
| 8 |  |  |  |  |  |  |  |  |

Matrix M0 (WEIGHTING: 1)

|  | 1 | 2 | 3 | 4 | 5 | 6 | 7 | 8 |
|---|---|---|---|---|---|---|---|---|
| 1 | 0 |  | 0 |  | 0 |  | 0 |  |
| 2 |  |  |  |  |  |  |  |  |
| 3 | 0 |  | 0 |  | 0 |  | 0 |  |
| 4 |  |  |  |  |  |  |  |  |
| 5 | 0 |  | 0 |  | 0 |  | 0 |  |
| 6 |  |  |  |  |  |  |  |  |
| 7 | 0 |  | 0 |  | 0 |  | 0 |  |
| 8 |  |  |  |  |  |  |  |  |

Matrix M1 (WEIGHTING: 1)

|  | 1 | 2 | 3 | 4 | 5 | 6 | 7 | 8 |
|---|---|---|---|---|---|---|---|---|
| 1 |  | 1 |  | 1 |  | 1 |  | 1 |
| 2 |  |  |  |  |  |  |  |  |
| 3 |  | 1 |  | 1 |  | 1 |  | 1 |
| 4 |  |  |  |  |  |  |  |  |
| 5 |  | 1 |  | 1 |  | 1 |  | 1 |
| 6 |  |  |  |  |  |  |  |  |
| 7 |  | 1 |  | 1 |  | 1 |  | 1 |
| 8 |  |  |  |  |  |  |  |  |

Fig.5

Matrix M (WEIGHTING: 4):

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 1 | 0 | 1 | 0 | 1 | 0 | 1 |
| COLUMN 2 | 2 | 3 | 2 | 3 | 2 | 3 | 2 | 3 |
| COLUMN 3 | 0 | 1 | 0 | 1 | 0 | 1 | 0 | 1 |
| COLUMN 4 | 2 | 3 | 2 | 3 | 2 | 3 | 2 | 3 |
| COLUMN 5 | 0 | 1 | 0 | 1 | 0 | 1 | 0 | 1 |
| COLUMN 6 | 2 | 3 | 2 | 3 | 2 | 3 | 2 | 3 |
| COLUMN 7 | 0 | 1 | 0 | 1 | 0 | 1 | 0 | 1 |
| COLUMN 8 | 2 | 3 | 2 | 3 | 2 | 3 | 2 | 3 |

M23 (WEIGHTING: 2):

|  | 1 | 2 | 3 | 4 | 5 | 6 | 7 | 8 |
|---|---|---|---|---|---|---|---|---|
| 1 |  |  |  |  |  |  |  |  |
| 2 | 2 | 3 | 2 | 3 | 2 | 3 | 2 | 3 |
| 3 |  |  |  |  |  |  |  |  |
| 4 | 2 | 3 | 2 | 3 | 2 | 3 | 2 | 3 |
| 5 |  |  |  |  |  |  |  |  |
| 6 | 2 | 3 | 2 | 3 | 2 | 3 | 2 | 3 |
| 7 |  |  |  |  |  |  |  |  |
| 8 | 2 | 3 | 2 | 3 | 2 | 3 | 2 | 3 |

M2 (WEIGHTING: 1):

|  | 1 | 2 | 3 | 4 | 5 | 6 | 7 | 8 |
|---|---|---|---|---|---|---|---|---|
| 1 |  |  |  |  |  |  |  |  |
| 2 | 2 |  | 2 |  | 2 |  | 2 |  |
| 3 |  |  |  |  |  |  |  |  |
| 4 | 2 |  | 2 |  | 2 |  | 2 |  |
| 5 |  |  |  |  |  |  |  |  |
| 6 | 2 |  | 2 |  | 2 |  | 2 |  |
| 7 |  |  |  |  |  |  |  |  |
| 8 | 2 |  | 2 |  | 2 |  | 2 |  |

M3 (WEIGHTING: 1):

|  | 1 | 2 | 3 | 4 | 5 | 6 | 7 | 8 |
|---|---|---|---|---|---|---|---|---|
| 1 |  |  |  |  |  |  |  |  |
| 2 |  | 3 |  | 3 |  | 3 |  | 3 |
| 3 |  |  |  |  |  |  |  |  |
| 4 |  | 3 |  | 3 |  | 3 |  | 3 |
| 5 |  |  |  |  |  |  |  |  |
| 6 |  | 3 |  | 3 |  | 3 |  | 3 |
| 7 |  |  |  |  |  |  |  |  |
| 8 |  | 3 |  | 3 |  | 3 |  | 3 |

Fig.7

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  | ● |  |  |  |  |  |  |
| COLUMN 3 |  |  |  |  |  | ● |  |  |
| COLUMN 4 | ● |  |  |  |  |  |  |  |
| COLUMN 5 |  |  | ● |  |  |  |  |  |
| COLUMN 6 |  |  |  |  |  |  |  | ● |
| COLUMN 7 |  |  |  | ● |  |  |  |  |
| COLUMN 8 |  |  |  |  |  |  | ● |  |

Fig.8

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 1 | 0 | 0 | 0 | 0 | 0 | 0 |
| COLUMN 3 | 0 | 0 | 0 | 0 | 0 | 1 | 0 | 0 |
| COLUMN 4 | 1 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 1 |
| COLUMN 7 | 0 | 0 | 0 | 1 | 0 | 0 | 0 | 0 |
| COLUMN 8 | 0 | 0 | 0 | 0 | 0 | 0 | 1 | 0 |

Fig.9

|          | ROW 1 | ROW 2 | ROW 3 | ROW 4 | ROW 5 |
|----------|-------|-------|-------|-------|-------|
| COLUMN 1 | 0     | 1     | 2     | 1     | 0     |
| COLUMN 2 | 1     | 3     | 4     | 3     | 1     |
| COLUMN 3 | 2     | 4     | 5     | 4     | 2     |
| COLUMN 4 | 1     | 3     | 4     | 3     | 1     |
| COLUMN 5 | 0     | 1     | 2     | 1     | 0     |

Fig.10

|   | 1 | 2 | 3 | 4 | 5 | 6 | 7 | 8 |   |   |   |   |   |   |   |   |   |   |   |   |
|---|---|---|---|---|---|---|---|---|---|---|---|---|---|---|---|---|---|---|---|---|
|   | 0 | 0 | 0 | 0 | 1 | 0 | 0 | 0 | 0 | 0 | 0 | 1 | 0 | 0 | 0 | 0 | 0 | 0 | 1 | 0 | 0 |
|   | 0 | 1 | 0 | 0 | 0 | 0 | 0 | 0 | 1 | 0 | 0 | 0 | 0 | 0 | 0 | 1 | 0 | 0 | 0 | 0 | 0 |
|   | 0 | 0 | 0 | 0 | 0 | 1 | 0 | 0 | 0 | 0 | 0 | 0 | 1 | 0 | 0 | 0 | 0 | 0 | 0 | 1 | 0 | 0 |
|   | 1 | 0 | 0 | 0 | 0 | 0 | 0 | 0 | 1 | 0 | 0 | 0 | 0 | 0 | 0 | 1 | 0 | 0 | 0 | 0 | 0 | 0 |
|   | 0 | 0 | 1 | 0 | 0 | 0 | 0 | 0 | 0 | 0 | 1 | 0 | 0 | 0 | 0 | 0 | 0 | 1 | 0 | 0 | 0 | 0 |
|   | 0 | 0 | 0 | 0 | 0 | 0 | 0 | 1 | 0 | 0 | 0 | 0 | 0 | 0 | 1 | 0 | 0 | 0 | 0 | 0 | 0 | 1 |
|   | 0 | 0 | 0 | 1 | 0 | 0 | 0 | 0 | 0 | 0 | 1 | 0 | 0 | 0 | 0 | 0 | 0 | 1 | 0 | 0 | 0 | 0 |
|   | 0 | 0 | 0 | 0 | 0 | 0 | 1 | 0 | 0 | 0 | 0 | 0 | 0 | 1 | 0 | 0 | 0 | 0 | 0 | 0 | 1 | 0 |
| 1 | 0 | 0 | 0 | 0 | 1 | 0 | 0 | 0 | 0 | 0 | 0 | 1 | 0 | 0 | 0 | 0 | 0 | 0 | 1 | 0 | 0 | 0 |
| 2 | 0 | 1 | 0 | 0 | 0 | 0 | 0 | 0 | 1 | 0 | 0 | 0 | 0 | 0 | 0 | 1 | 0 | 0 | 0 | 0 | 0 | 0 |
| 3 | 0 | 0 | 0 | 0 | 0 | 1 | 0 | 0 | 0 | 0 | 0 | 0 | 1 | 0 | 0 | 0 | 0 | 0 | 0 | 1 | 0 | 0 |
| 4 | 1 | 0 | 0 | 0 | 0 | 0 | 0 | 0 | 1 | 0 | 0 | 0 | 0 | 0 | 0 | 1 | 0 | 0 | 0 | 0 | 0 | 0 |
| 5 | 0 | 0 | 1 | 0 | 0 | 0 | 0 | 0 | 0 | 0 | 1 | 0 | 0 | 0 | 0 | 0 | 0 | 1 | 0 | 0 | 0 | 0 |
| 6 | 0 | 0 | 0 | 0 | 0 | 0 | 0 | 1 | 0 | 0 | 0 | 0 | 0 | 0 | 1 | 0 | 0 | 0 | 0 | 0 | 0 | 1 |
| 7 | 0 | 0 | 0 | 1 | 0 | 0 | 0 | 0 | 0 | 0 | 1 | 0 | 0 | 0 | 0 | 0 | 0 | 1 | 0 | 0 | 0 | 0 |
| 8 | 0 | 0 | 0 | 0 | 0 | 0 | 1 | 0 | 0 | 0 | 0 | 0 | 0 | 1 | 0 | 0 | 0 | 0 | 0 | 0 | 1 | 0 |
|   | 0 | 0 | 0 | 0 | 1 | 0 | 0 | 0 | 0 | 0 | 0 | 1 | 0 | 0 | 0 | 0 | 0 | 0 | 1 | 0 | 0 | 0 |
|   | 0 | 1 | 0 | 0 | 0 | 0 | 0 | 0 | 1 | 0 | 0 | 0 | 0 | 0 | 0 | 1 | 0 | 0 | 0 | 0 | 0 | 0 |
|   | 0 | 0 | 0 | 0 | 0 | 1 | 0 | 0 | 0 | 0 | 0 | 0 | 1 | 0 | 0 | 0 | 0 | 0 | 0 | 1 | 0 | 0 |
|   | 1 | 0 | 0 | 0 | 0 | 0 | 0 | 0 | 1 | 0 | 0 | 0 | 0 | 0 | 0 | 1 | 0 | 0 | 0 | 0 | 0 | 0 |
|   | 0 | 0 | 1 | 0 | 0 | 0 | 0 | 0 | 0 | 0 | 1 | 0 | 0 | 0 | 0 | 0 | 0 | 1 | 0 | 0 | 0 | 0 |
|   | 0 | 0 | 0 | 0 | 0 | 0 | 1 | 0 | 0 | 0 | 0 | 0 | 0 | 1 | 0 | 0 | 0 | 0 | 0 | 0 | 0 | 1 |
|   | 0 | 0 | 0 | 1 | 0 | 0 | 0 | 0 | 0 | 0 | 1 | 0 | 0 | 0 | 0 | 0 | 0 | 1 | 0 | 0 | 0 | 0 |
|   | 0 | 0 | 0 | 0 | 0 | 0 | 1 | 0 | 0 | 0 | 0 | 0 | 0 | 1 | 0 | 0 | 0 | 0 | 0 | 0 | 1 | 0 |

Fig.11

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 4 | 4 | 6 | 7 | 8 | 9 | 7 | 4 |
| COLUMN 2 | 6 | 6 | 5 | 6 | 7 | 8 | 6 | 5 |
| COLUMN 3 | 7 | 8 | 6 | 5 | 6 | 6 | 5 | 6 |
| COLUMN 4 | 8 | 9 | 7 | 4 | 4 | 4 | 6 | 7 |
| COLUMN 5 | 9 | 8 | 7 | 6 | 4 | 3 | 5 | 7 |
| COLUMN 6 | 7 | 7 | 7 | 7 | 4 | 4 | 6 | 7 |
| COLUMN 7 | 4 | 4 | 6 | 7 | 7 | 7 | 7 | 7 |
| COLUMN 8 | 4 | 3 | 5 | 7 | 9 | 8 | 7 | 6 |

Fig.12

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  |  |  |  |  |  |  |  |
| COLUMN 3 |  |  |  |  |  |  |  |  |
| COLUMN 4 |  |  |  |  |  |  |  |  |
| COLUMN 5 |  |  | ● |  |  |  |  |  |
| COLUMN 6 |  |  |  |  |  |  |  |  |
| COLUMN 7 |  |  |  |  |  |  |  |  |
| COLUMN 8 |  |  |  |  |  |  |  |  |

Fig.13

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 0 | 0 | 0 | 0 | 0 | 0 | 0 |
| COLUMN 3 | 0 | 0 | 0 | 0 | 0 | 0 | 0 | 0 |
| COLUMN 4 | 0 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 0 |
| COLUMN 7 | 0 | 0 | 0 | 0 | 0 | 0 | 0 | 0 |
| COLUMN 8 | 0 | 0 | 0 | 0 | 0 | 0 | 0 | 0 |

Fig.14

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  |  |  |  |  |  |  |  |
| COLUMN 3 |  |  |  |  |  | ● |  |  |
| COLUMN 4 |  |  |  |  |  |  |  |  |
| COLUMN 5 |  |  | ● |  |  |  |  |  |
| COLUMN 6 |  |  |  |  |  |  |  |  |
| COLUMN 7 |  |  |  | ● |  |  |  |  |
| COLUMN 8 |  |  |  |  |  |  |  |  |

Fig.15

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 0 | 0 | 0 | 0 | 0 | 0 | 0 |
| COLUMN 3 | 0 | 0 | 0 | 0 | 0 | 1 | 0 | 0 |
| COLUMN 4 | 0 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 0 |
| COLUMN 7 | 0 | 0 | 0 | 1 | 0 | 0 | 0 | 0 |
| COLUMN 8 | 0 | 0 | 0 | 0 | 0 | 0 | 0 | 0 |

Fig.16

|  | 1 | 2 | 3 | 4 | 5 | 6 | 7 | 8 |
|---|---|---|---|---|---|---|---|---|
| 1 | 0 |  | 2 |  | 5 |  | 2 |  |
| 2 |  |  |  |  |  |  |  |  |
| 3 | 0 |  | 2 |  | 2 |  | 0 |  |
| 4 |  |  |  |  |  |  |  |  |
| 5 | 2 |  | 5 |  | 2 |  | 0 |  |
| 6 |  |  |  |  |  |  |  |  |
| 7 | 0 |  | 2 |  | 2 |  | 0 |  |
| 8 |  |  |  |  |  |  |  |  |

Fig.17

|   | 1 | 2 | 3 | 4 | 5 | 6 | 7 | 8 |
|---|---|---|---|---|---|---|---|---|
| 1 | 0 | 0 | 3 | 6 | 7 | 6 | 3 | 0 |
| 2 |   |   |   |   |   |   |   |   |
| 3 | 0 | 1 | 2 | 4 | 6 | 6 | 4 | 2 |
| 4 |   |   |   |   |   |   |   |   |
| 5 | 2 | 4 | 6 | 6 | 4 | 2 | 1 | 0 |
| 6 |   |   |   |   |   |   |   |   |
| 7 | 0 | 3 | 6 | 7 | 6 | 3 | 0 | 0 |
| 8 |   |   |   |   |   |   |   |   |

Fig.18

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 16 |  | 32 |  | DONE |  | 36 |  |
| COLUMN 2 |  |  |  |  |  |  |  |  |
| COLUMN 3 | 28 |  | 30 |  | 38 |  | 28 |  |
| COLUMN 4 |  |  |  |  |  |  |  |  |
| COLUMN 5 | 42 |  | DONE |  | 26 |  | 22 |  |
| COLUMN 6 |  |  |  |  |  |  |  |  |
| COLUMN 7 | 16 |  | 38 |  | 42 |  | 28 |  |
| COLUMN 8 |  |  |  |  |  |  |  |  |

Fig.20

$$\text{RMS GRANULARITY LEVEL} = \sqrt{\frac{\Sigma(\text{EVALUATION VALUE} - \text{EVALUATION VALUE AVERAGE})^2}{\text{PIXEL COUNT}}}$$

Fig.21

VARIATION EXAMPLE

| | | | | 1 | 2 | 3 | 4 | 5 | 6 | 7 | 8 |
|---|---|---|---|---|---|---|---|---|---|---|---|
| | | | | 0 | | 0 | | 1 | | 0 | |
| 0 | 0 | 1 | 0 | 0 | 0 | 0 | 0 | 0 | 0 | 1 | 0 |
| 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 0 | 0 |
| 0 | 0 | 0 | 0 | 0 | 0 | 1 | 0 | 0 | 0 | 0 | 0 |
| 0 | 0 | 1 | 0 | 0 | 0 | 0 | 0 | 0 | 0 | 1 | 0 |
| 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 0 | 0 |
| 0 | 0 | 0 | 0 | 0 | 0 | 1 | 0 | 0 | 0 | 0 | 0 |
| 0 | 0 | 1 | 0 | 0 | 0 | 0 | 0 | 0 | 0 | 1 | 0 |
| 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 0 | 0 |
| 0 | 0 | 0 | 0 | | | | | 0 | 0 | 0 | 0 |

HALFTONE PROCESS GIVING SPECIFIED CHARACTERISTICS TO PARTICULAR DOT PATTERNS, AND GENERATING AND EVALUATING A DITHER MATRIX THEREFOR

BACKGROUND OF THE INVENTION

1. Field of the Invention

This invention relates to technology for printing an image by forming dots on a print medium.

2. Description of the Related Art

As output devices for images created using a computer or images shot using a digital camera or the like, printing devices that print images by forming dots on a printing medium are widely used. These printing devices perform gradation expression using a halftone process because there are few dot tone values that can be formed for the input tone values. As one halftone process, an ordered dither method using a dither matrix is widely used. The ordered dither method has a big effect on the image quality according to the dither matrix contents, so for example as disclosed in JP-A-7-177351, JP-A-7-81190, and JP-A-10-329381, an attempt was made to optimize the dither matrix using an analysis method of simulated annealing or genetic algorithm using an evaluation function taking into consideration the human visual sense.

However, with this kind of dither matrix optimization process, ink dots are formed by doing a plurality of scans of a common area on the printing medium, and there was no consideration of the degradation of the image quality due to printing of the images in this way. Furthermore, this kind of image quality degradation is not limited to halftone processing using the dither matrix, but also generally occurred with printing using halftone processing with the error diffusion method or other methods.

SUMMARY OF THE INVENTION

The present invention was created to address the problems described above with the prior art, and its purpose is to provide technology for forming ink dots by doing a plurality of scans of the common area on a printing medium and for suppressing image quality degradation due to printing of images in this way.

In order to attain the above and the other objects of the present invention, there is provided a printing method of printing on a printing medium. The method includes: a dot data generating step of performing a halftone process on image data representing a input tone value of each of pixels constituting an original image to determine a status of dot formation on each of print pixels of a print image to be formed on the print medium, for generating dot data representing the determined status of dot formation; and a print image generating step of forming a dot on each of the print pixels for generating the print image according to the dot data. The print image generating step includes the step of generating the print image by mutually combining dots formed on print pixels belonging to each of a plurality of pixel groups in a common print area, the plurality of pixel groups having a physical difference each other at the dot formation, the dot formation being performed with respect to each of the pixel groups. A plurality of pixel groups having a physical commonality for the dot formation among the plurality of pixel groups constitute a pixel group family. The halftone process is configured to give specified characteristics to all of a first dot pattern, a second dot pattern, and a third dot pattern, the first dot pattern being formed on print pixels of the print image, the second dot pattern being formed on print pixels belonging to each of the plurality of pixel groups, and the third dot pattern being formed on print pixels belonging to the pixel group family.

With the printing method of the present invention, focusing on the dot pattern for the dot formation process, dot patterns are formed to have specified characteristics for a plurality of pixel groups formed almost simultaneously with each main scan and for groups of pixel groups containing the plurality of pixel groups having physical commonality, so the unevenness that occurs with the formation process of dots formed almost simultaneously with each main scan is suppressed by focusing on the pixel group dot patterns, and the degradation of the image quality due to dot formation position skew (one physical difference) is suppressed by focusing on the group of pixel groups dot patterns.

Here, physical commonality is the uniformity of the main scan direction (described later) when forming dots or the uniformity of the printing head in cases when printing using a plurality of printing heads, for example. If the main scan direction or the printing head are the same, there is the property of the correlation of the dot forming positions being very accurate compared to when the main scan direction or the printing heads are different, so it is possible to make this plurality of pixel groups into one unit and handle them as groups of pixel groups, and if that dot pattern dispersibility is improved, it is possible to greatly suppress the image quality degradation due to dot formation position skew.

Here, "give specified characteristics to all of dot patterns" means for example that when the specified characteristic is the criterion of the granularity index, as with the prior art, rather than optimizing so that only the granularity index of the print image dot pattern is low, optimization is done so that the granularity index of the pixel group and groups of pixel groups dot pattern is also low. Specifically, the print image dot pattern granularity index is allowed to become slightly high, and optimization is done so that the pixel group and group of pixel groups dot pattern granularity index is low. To say this another way, this means that the constitution is such that the granularity indexes are close to each other.

In this way, the halftone processing method of the present invention slightly sacrifices the optimality of the print image dot pattern, and the point of markedly increasing the optimality of the pixel group and groups of pixel groups dot patterns allows objective distinguishing from the prior art halftone processing method by monitoring each dot pattern.

Note that the present invention can be realized with various aspects including a printing device, a dither matrix, a dither matrix generating device, a printing device or printing method using a dither matrix, or a printed matter generating method, or can be realized with various aspects such as a computer program for realizing the functions of these methods or devices on a computer, a recording medium on which that computer program is recorded, data signals containing that computer program and embodied within a carrier wave, and the like.

Also, for use of the dither matrix for the printing device, printing method, or printed matter generating method, by comparing the threshold value set in the dither matrix with the image data tone value for each pixel, a decision is made of whether or not dots are formed for each pixel, but, for example, it is also possible to make a decision on whether or not dots are formed by comparing the sum of the threshold value and the tone value with a fixed value. Furthermore, it is also possible to make a decision on whether or not dots are formed according to data generated in advance based on the threshold value and on the tone value without directly using the threshold value. The dither method of the present invention generally is acceptable as long as the judgment of whether or not to form dots is made according to the tone value of each pixel and on the threshold value set in the pixel position corresponding to the dither matrix.

BRIEF DESCRIPTION OF THE DRAWINGS

FIG. 4 is an explanatory drawing showing the dither matrix for which the grouping process is performed with the first embodiment of the present invention;

FIG. 5 is an explanatory drawing showing the dither matrix for which the grouping process is performed with the first embodiment of the present invention;

FIG. 7 is an explanatory drawing showing the state of formation of dots on each of the eight pixels corresponding to the elements in which are stored threshold values for which dots are easily formed first to eighth for the dither matrix M;

FIG. 8 is an explanatory drawing showing the dot density matrix quantitatively representing the dot density;

FIG. 9 is an explanatory drawing showing the low pass filter for the first embodiment of the present invention;

FIG. 10 is an explanatory drawing showing the state of placing the same dot density matrix in the periphery to perform calculation of the periphery part of the dot density matrix;

FIG. 11 is an explanatory drawing showing the results of the low pass filter process on the dot density matrix;

FIG. 12 is an explanatory drawing showing the dot pattern for which only the dots formed on pixels corresponding to the element group M0 are extracted;

FIG. 13 is an explanatory drawing showing the dot density matrix relating to the pixels corresponding to the element group M0;

FIG. 14 is an explanatory drawing showing the dot pattern for which only the dots corresponding to the pixels belonging to the group of element groups M01 are extracted from the dot pattern of FIG. 7;

FIG. 15 is an explanatory drawing showing the dot density matrix relating to the pixels corresponding to the group of element groups M01;

FIG. 16 is an explanatory drawing showing the calculated group evaluation value;

FIG. 17 is an explanatory drawing showing the calculate groups group evaluation value;

FIG. 18 is an explanatory drawing showing the matrix for storing the set comprehensive evaluation value;

FIG. 20 is an explanatory drawing showing the calculation formula used for the RMS granularity calculation process; and FIG. 21 is an explanatory drawing showing the state of placing the same dot density matrix in the periphery to perform calculation of the peripheral part of the dot density matrix for the variation example.

DESCRIPTION OF THE PREFERRED EMBODIMENT

Figure 1:
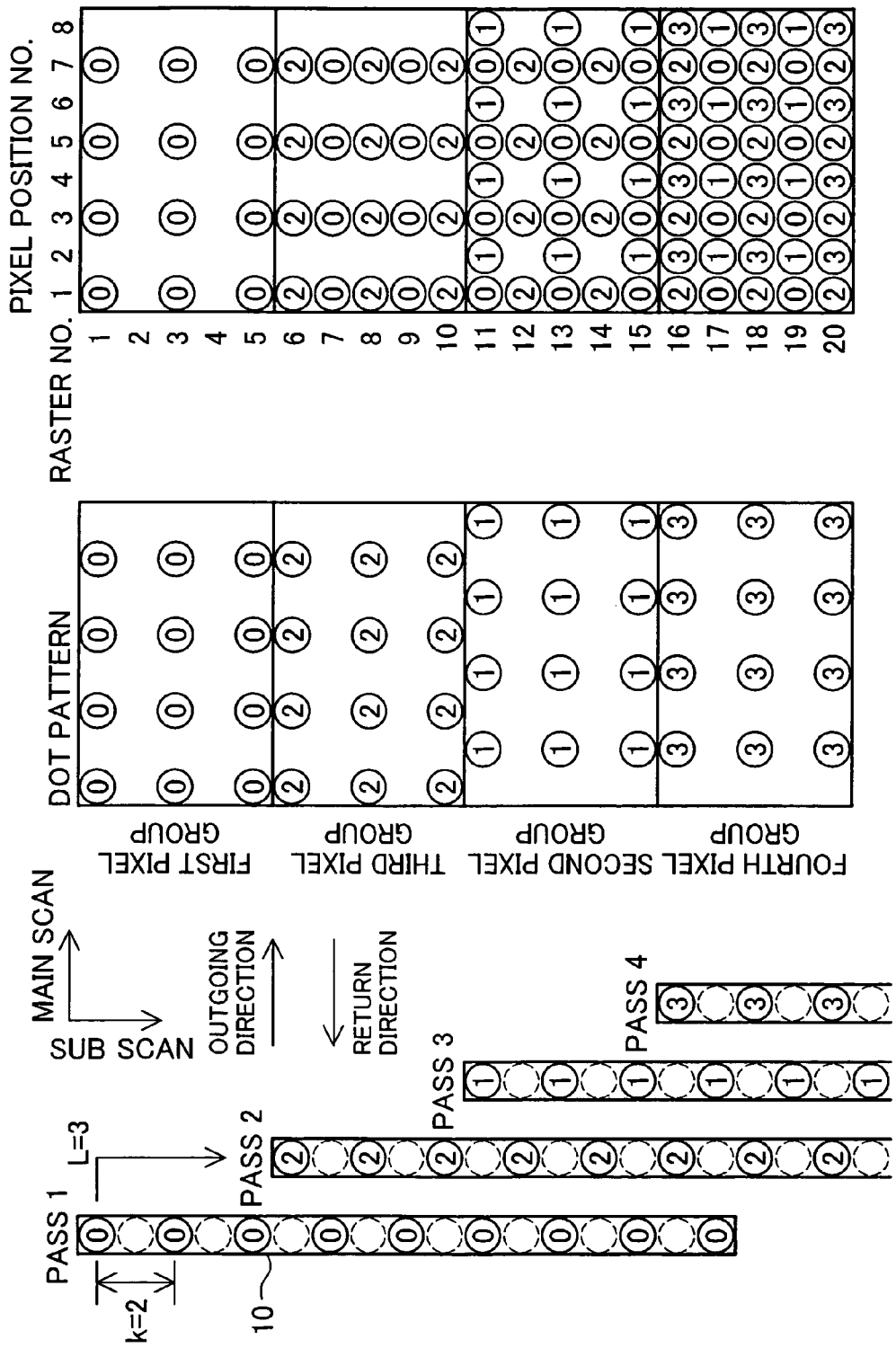
FIG. 1 is an explanatory drawing showing the state of the print image being generated on the printing medium by forming ink dots while performing main scanning and sub scanning for the first embodiment of the present invention.

The present invention is explained in the following sequence based on embodiments.
A. Generation of Print images Executed While Performing Main Scanning and Sub Scanning:
B. Dither Matrix Generating Method for the First Embodiment:
C. Dither Matrix Generating Method for the Second Embodiment:
D. Variation Example:

A. Generation of Print Images Executed While Performing Main Scanning and Sub Scanning:

FIG. 1 is an explanatory drawing showing the state of the print image being generated on the printing medium by forming ink dots while performing main scanning and sub scanning for the first embodiment of the present invention. The main scan means the operation of moving the printing head 10 relatively in the main scan direction in relation to the printing medium. The sub scan means the operation of moving the printing head 10 relatively in the sub scan direction in relation to the printing medium. The printing head 10 is constituted so as to form ink dots by spraying ink drops on the printing medium. The printing head 10 is equipped with ten nozzles that are not illustrated at intervals of 2 times the pixel pitch k.

Generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scan direction. Each circle indicates the dot forming position. The number inside each circle indicates the pixel groups constituted from the plurality of pixels for which ink dots are formed simultaneously. With pass 1, dots are formed on the print pixels belong to the first pixel group while a main scan of the printing head 10 is done in the main direction.

When the pass 1 main scan is completed, the sub scan sending is performed at a movement volume L of 3 times the pixel pitch in the sub scan direction. Typically, the sub scan sending is performed by moving the printing medium, but with this embodiment, the printing head 10 is moved in the sub scan direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the third pixel group while main scanning of the printing head 10 is performed in the return direction. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8 while doing a main scan of the printing head 10 in the outgoing direction. With the pass 4 main scan, among the ten main scan lines including the three main scan lines for which the raster numbers are 16, 18, and 20 while doing a main scan of the printing head 10 in the return direction, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the second and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 5. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the third pixel group. With pass 3, at the focus area, dots are formed at the pixels belonging to the second pixel group. With pass 4, at the focus area, dots are formed at the pixels belonging to the fourth pixel group.

In this way, with this embodiment, we can see that the dots formed at the print pixels belonging to each of the plurality of first to fourth pixel groups are formed by mutually combining at the common print area.

Figure 2:
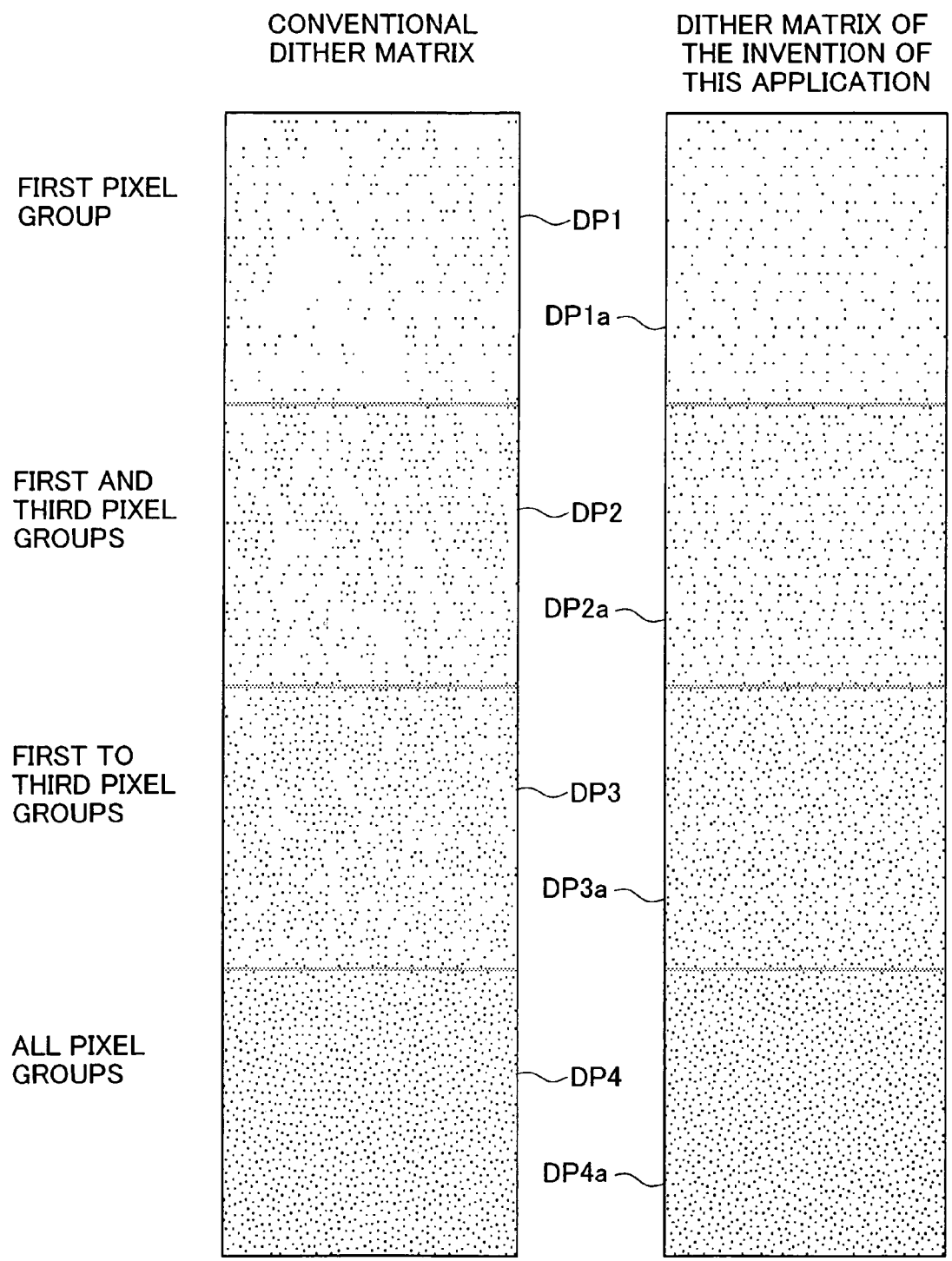
FIG. 2 is an explanatory drawing showing the state of generating a print image on a printing medium by mutually combining at a common print area the dots formed on the print pixels belonging to each of the plurality of pixel groups for the first embodiment of the present invention.

FIG. 2 is an explanatory drawing showing the state of generating a print image on a printing medium by mutually combining on a common print area the dots formed on the print pixels belonging to each of the plurality of pixel groups for the first embodiment of the present invention. With the example of FIG. 2, the print image is the print image of a specified medium gradation (single color). The dot patterns DP1 and DP1a indicate dot patterns formed at a plurality of pixels belonging to the first image group. The dot patterns DP2 and DP2a indicate dot patterns formed on the plurality of pixels belonging to the first and third pixel groups. The dot patterns DP3 and DP3a indicate dot patterns formed on the plurality of pixels belonging to the first to third pixel groups. The dot patterns DP4 and DP4a indicate dot patterns formed on the plurality of pixels belonging to all the pixel groups.

The dot patterns DP1, DP2, DP3, and DP4 are dot patterns when using the dither matrix of the prior art. The dot patterns DP1a, DP2a, DP3a, and DP4a are dot patterns when using the dither matrix of the invention of this application. As can be understood from FIG. 2, when using the dither matrix of the invention of this application, especially with the dot patterns DP1a and DP2a for which there is little dot pattern overlap, the dot dispersibility is more uniform than when using the dither matrix of the prior art.

With the dither matrix of the prior art, optimization is performed focusing only on the dot dispersibility for the finally formed print image (with the example in FIG. 2, dot pattern DP4) because there is no concept of a pixel group. To say this another way, because the dispersibility of dots formed on the pixels belonging to each pixel group is not considered, the dispersibility of dots formed on the pixels belonging to each pixel group is poor, and dot density sparseness occurs.

The dither matrix of the invention of this application, in addition to the dispersibility of the dots for the print image, also considers up to the dispersibility of the dots formed on the pixels belonging to each pixel group, so the dispersibility of the dots formed on the pixels belonging to each pixel group and the dispersibility of dots for the print image are both improved.

The dither matrix of the invention of this application attempts to optimize not only the finally formed dot patterns, but also focuses on dot patterns with the dot forming process. This kind of focus point did not exist in the past. This is because in the past, the technical basic assumption was that even if the dot pattern dispersion was poor with the dot forming process, the image quality was good if the dispersibility of the dot patterns formed at the end were good.

However, the inventors of this application went ahead and performed an analysis of the image quality of print images focusing on the dot patterns with the dot forming process. As a result of this analysis, it was found that image unevenness occurs due to dot pattern sparseness with the dot forming process. This image unevenness was ascertained by the inventors of this application to be strongly perceived by the human eye as ink physical phenomena such as ink agglomeration unevenness, glossiness, or the bronzing phenomenon. Note that the bronzing phenomenon is a phenomenon by which the status of the light reflected by the printing paper surface is changed, such as the printing surface exhibiting a color of a bronze color or the like due to ink drop pigment agglomeration or the like.

For example, the ink agglomeration or bronzing phenomenon can occur even in cases when a print image is formed with one pass. However, even when ink agglomeration or the like occurs uniformly on the entire surface of the print image, it is difficult to be seen by the human eye. This is because since it occurs uniformly, ink agglomeration or the like does not occur as non-uniform "unevenness" including low frequency components.

However, when unevenness occurs with low frequency areas which are easily recognized by the human eye with ink agglomeration or the like for dot patterns formed in pixel groups for which ink dots are formed almost simultaneously with the same main scan, this is manifested as a strong image quality degradation. In this way, when forming print images using ink dot formation, it was first found by the inventors that optimization of the dither matrix focusing also on dot patterns formed in pixel groups for which ink dots are formed almost simultaneously is linked to higher image quality.

In addition, with the dither matrix of the prior art, optimization was attempted with the prerequisite that the mutual positional relationship of each pixel group is as presupposed, so optimality is not guaranteed when the mutual positional relationship is skewed, and this was a cause of marked degradation of the image quality. However, dot dispersibility is ensured even with dot patterns for each pixel group for which mutual positional relationship skew is assumed, so it was first confirmed by experiments of the inventors of the invention of this application that it is possible to also ensure a high robustness level in relation to mutual positional relationship skew.

With bidirectional printing, it was found that the mutual positional relationship skew almost does not occur at all when the main scan direction during dot formation is the same, and that there is a marked occurrence when the main scan direction during dot formation is different. For example with the example described above, with pass 1 and pass 3, dots are formed while doing a main scan of the printing head 10 in the same outgoing direction, so there is almost no occurrence of mutual positional relationship skew of dots formed with pass 1 and pass 3. The same is also true for pass 2 and pass 4.

Meanwhile, when the main scan direction is different such as with pass 1 and pass 2, marked skew occurs with the dot forming position.

In this way, skew of the mutual positional relationship occurs between the first and second pixel groups formed by pass 1 and pass 3 and the third and fourth pixel groups formed by pass 2 and pass 4. Specifically, skew of the mutual positional relationship occurs between the group of pixel groups constituted from the first pixel group and the second pixel group and the group of pixel groups constituted from the third pixel group and the fourth pixel group. Thus, it was first confirmed by the inventors of the invention of this application that if the dispersibility of dots formed for these two groups of pixel groups is ensured, it is possible to also ensure high robustness in relation to mutual positional relationship skew. Note that uniformity of the main scan direction correlates to "having a physical commonality" in the claims with this example.

Furthermore, for the technical concept of the invention of this application, it was also ascertained by the inventors that the importance increases as the printing speed accelerates. This is because acceleration of the printing speed is connected to the formation of dots in the next pixel group during the time that sufficient time has not been taken for ink absorption. The invention of this application is constituted as follows based on these kinds of totally novel findings.

Figure 3:
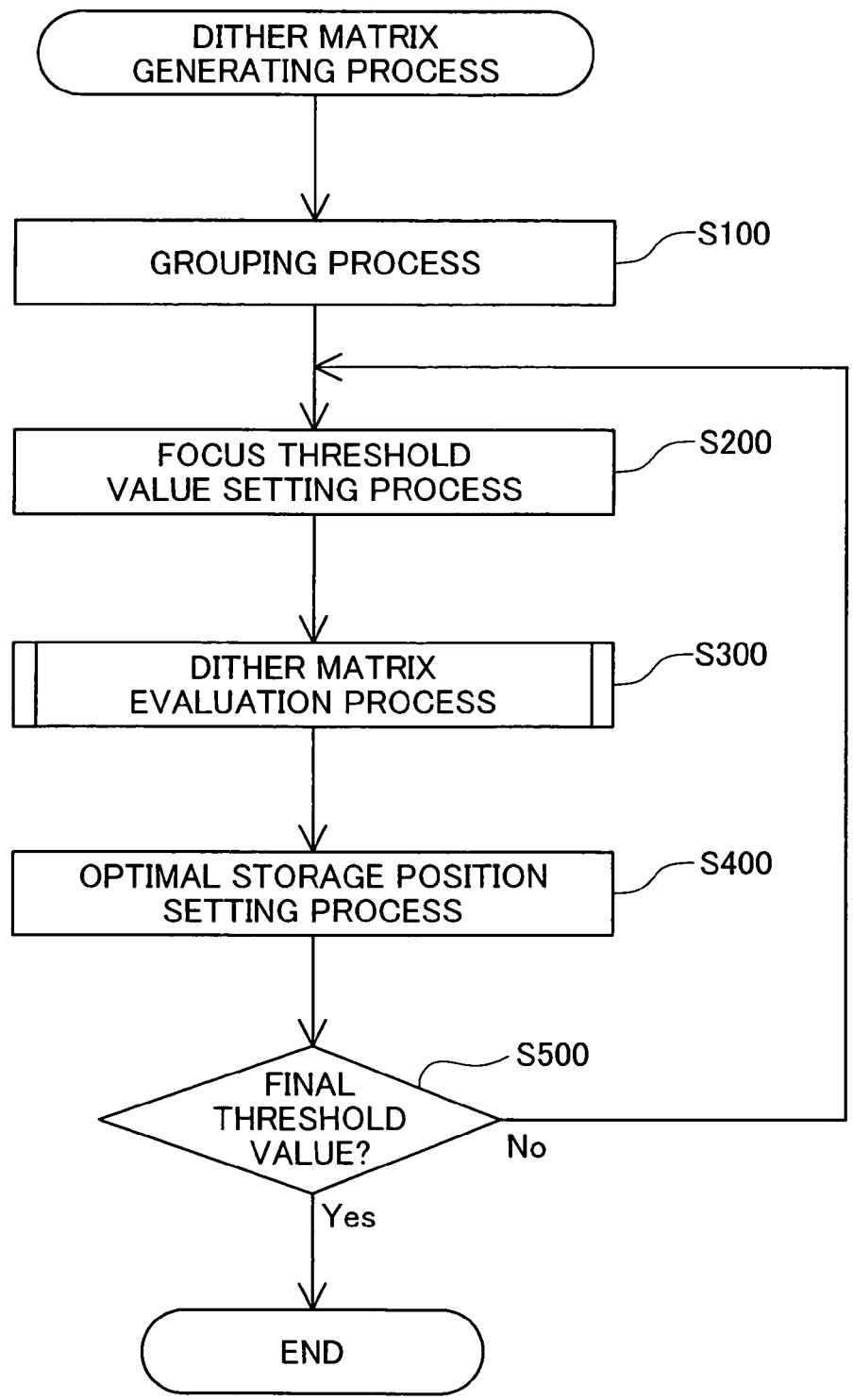
FIG. 3 is a flow chart showing the processing routine of the dither matrix generating method for the first embodiment of the present invention.

B. Dither Matrix Generating Method for the First Embodiment:

FIG. 3 is a flow chart showing the processing routine of the dither matrix generating method for the first embodiment of the present invention. This dither matrix generating method is constituted so that it is possible to attempt to optimize considering the dispersibility of dots formed almost simultaneously with the print image forming process and dot forming position skew. Note that with this example, to make the description easy to understand, a small 8 row, 8 column dither matrix is generated.

At step S100, the grouping process is performed. With this embodiment, the grouping process is equipped with a process of dividing the dither matrix for each element that corresponds to the plurality of pixel groups for which dots are formed almost simultaneously with the print image forming process. The grouping process of this embodiment further generates two groups of pixel groups based on the uniformity of the main scan direction of the plurality of pixel groups.

FIG. 4 and FIG. 5 are explanatory drawings showing the dither matrix for which the grouping process is performed with the first embodiment of the present invention. With this grouping process, division is done into the four pixel groups shown in FIG. 1, and constituted are a group of pixel groups for which dots are formed in the outgoing direction of the main scan, and a group of pixel groups for which dots are formed in the return direction of the main scan. The empty space element is an element for which dots are never formed regardless of the input tone value.

FIG. 4 shows the dither matrix M, the element group M0 corresponding to the first pixel group (FIG. 1), the element group M1 corresponding to the second pixel group, and the group of element groups M01 corresponding to the pixel groups for which dots are formed in the outgoing direction of the main scan. The group of element groups M01 is constituted by combining the element group M0 and the element group M1. This is because the element group M0 and the element group M1 both have dots formed with the outgoing direction of the main scan.

FIG. 5 shows the dither matrix M, the element group M2 corresponding to the third pixel group, the element group M3 corresponding to the fourth pixel group, and the group of element groups M23 corresponding to the pixel groups for which dots are formed in the return direction of the main scan. The group of element groups M23 is constituted by combining the element group M2 and the element group M3. This is because both the element group M2 and the element group M3 have dots formed in the return direction of the main scan.

Working in this way, when the grouping process of step S100 (FIG. 3) is completed, the process advances to the focus threshold value setting step (step S200).

At step S200, the focus threshold value setting process is performed. The focus threshold value setting process is the process of setting the threshold value subject to storage element setting. With this embodiment, threshold values are set by selecting in sequence from relatively small value threshold values, specifically, threshold values of values for which dots are formed easily. The reason for this is described later.

At step S300, the dither matrix evaluation process is performed. The dither matrix evaluation process is the process of converting to numbers the optimality of the dither matrix based on a preset evaluation function. With this embodiment, the evaluation function is uniformity of the dot recording density. Specifically, whether or not the plurality of dots formed on pixels corresponding to each element of the matrix are formed uniformly for each tone value is the evaluation criterion. However, with this embodiment, rather than considering only the dither matrix M, evaluation is performed considering the four element groups M0 to M3 and the two groups of element groups M01 and M23.

Figure 6:
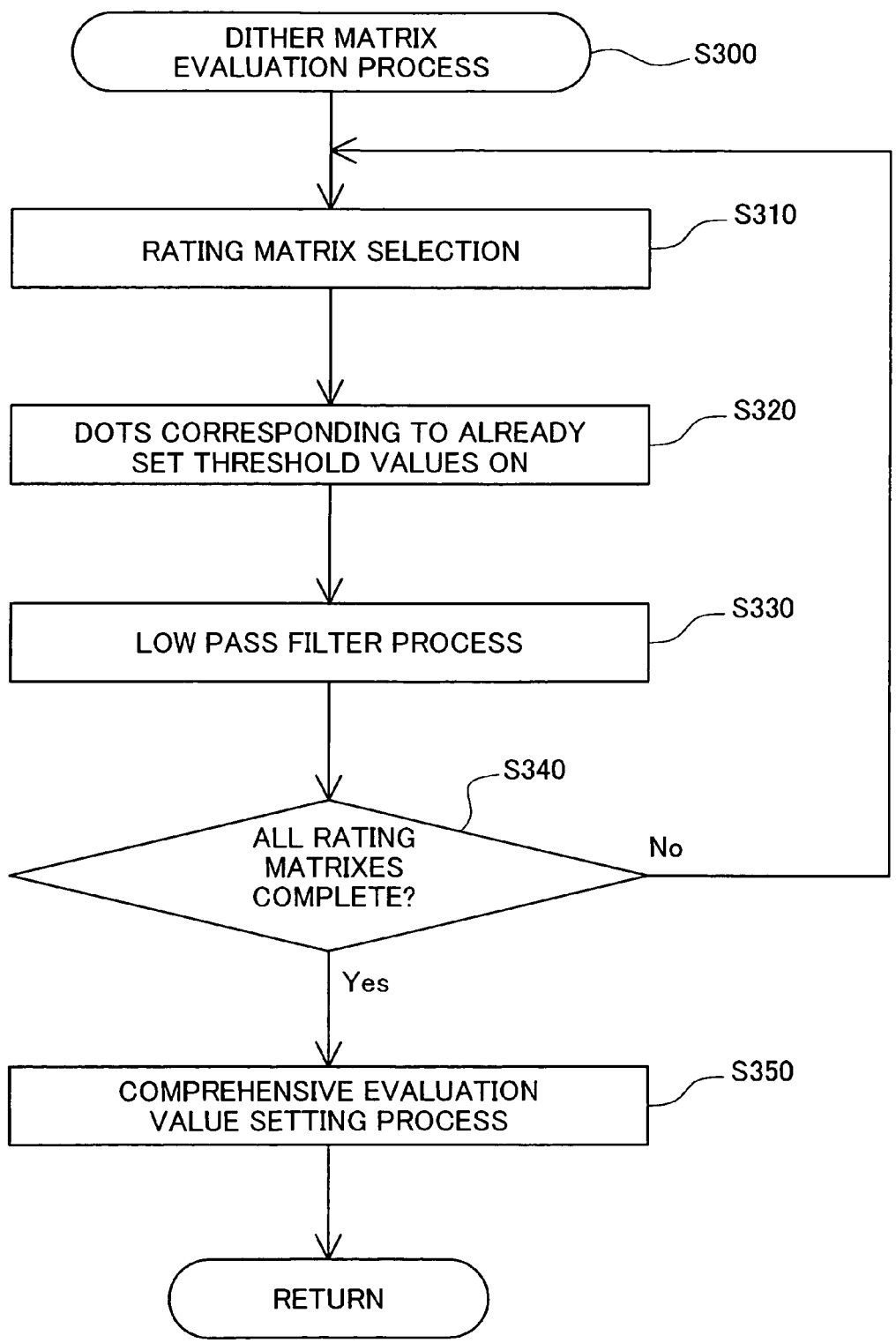
FIG. 6 is a flow chart showing the processing routine of the dither matrix evaluation process.

FIG. 6 is a flow chart showing the processing routine of the dither matrix evaluation process. At step S310, the rating element group is selected. The rating element group means one matrix subject to evaluation when setting the focus threshold value storage elements among the four element groups M0 to M3. With this embodiment, evaluation is performed focusing on the rating element group, the group of element groups including the rating element group, and the dither matrix M.

With this embodiment, the rating element group is selected in sequence together with the focus threshold value. In specific terms, the divided rating element groups are selected in sequence using the method of the element group M0 being selected with the first focus threshold value, and the element group M1 being selected with the second focus threshold value.

Meanwhile, when selecting the element group M0, the group of element groups M01 including the element group M0 is selected, and when selecting the element groups M1, M2, and M3, the groups of element groups M01, M23, and M23 are respectively selected.

At step S320, the dots corresponding to already set threshold values are on. Already set threshold values mean threshold values for which storage elements are set. With this embodiment, as described previously, selection is done in sequence from threshold values of values for which dot formation is easier, so when forming dots on the focus threshold value, dots are always formed on pixels corresponding to elements in which are stored the already set threshold values. Conversely, for the smallest input tone values for which dots are formed at the focus threshold value, dots are not formed on pixels corresponding to elements other than the elements in which are stored the already set threshold values.

FIG. 7 is an explanatory drawing showing the state of formation of dots on each of the eight pixels corresponding to the elements in which are stored threshold values for which dots are easily formed first to eighth for the dither matrix M. This dot pattern is used for setting which pixel the ninth dot is to be formed at. Specifically, it is used for setting the storage element of the focus threshold value for which it is easy for a dot to be formed ninth. With this embodiment, setting of the storage element is setting of the storage element so that the focus threshold value is stored in the element corresponding to the pixels for which dot formation is sparse. This is because the evaluation criterion is whether or not the plurality of dots formed at the pixels corresponding to each element of the matrix are formed uniformly.

FIG. 8 is an explanatory drawing showing the matrix for which the state of dot formation on each of the eight pixels in FIG. 7 are converted to numbers, specifically, the dot density matrix quantitatively representing the dot density. The number 0 means that dots are not formed, and the number 1 means that dots are formed.

At step S330, the low pass filter process is performed. The low pass filter process is the process of extracting the low frequency components for the dot density matrix described previously. Extracting the low frequency component is for optimizing the dither matrix considering the human visual sensitivity characteristic of being relatively highly sensitive at low frequency areas.

FIG. 9 is an explanatory drawing showing the low pass filter for the first embodiment of the present invention. With this embodiment, the results of the filtering process are used only for size comparison of the dot density, so normalization of the low pass filter is not performed. For the filtering process, as shown in FIG. 10, the same dot density matrix is placed in the periphery and this is used for calculation of the peripheral part of the dot density matrix.

FIG. 11 is an explanatory drawing showing the results of the low pass filter process on the dot density matrix. The numbers in each element represent the overall evaluation value. The overall evaluation value means the evaluation value of each element when assuming that the ninth dot is formed for the dither matrix M for which eight threshold value storage elements are set. Large numbers mean that the dot density is high, and small numbers mean that the dot density is low, in other words, that the dots are sparse.

FIG. 12 is an explanatory drawing showing the dot pattern for which only the dots formed on pixels corresponding to the element group M0 are extracted from the dot pattern of FIG. 7. With this embodiment, the storage elements are set so that the focus threshold value is stored in elements corresponding to the pixels for which dot formation is sparse even for the pixels belonging to the element group M0.

FIG. 13 is an explanatory drawing showing the dot density matrix relating to the pixels corresponding to the element group M0. When the low pass filter process (step S330) is performed on this dot density matrix, the group evaluation value (FIG. 16) is calculated. The group evaluation value means the evaluation value of each element when it is assumed that the third dot is formed for the dither matrix M for which two threshold value storage elements are set. The group evaluation value calculated in this way is used for setting the comprehensive evaluation value.

FIG. 14 is an explanatory drawing showing the dot pattern for which only the dots corresponding to the pixels belonging to the group of element groups M01 are extracted from the dot pattern of FIG. 7. With this embodiment, storage elements are set so that focus threshold values are stored in the elements corresponding to the pixels for which dot formation is sparse even for pixels belonging to the group of element groups M01.

FIG. 15 is an explanatory drawing showing the dot density matrix relating to the pixels corresponding to the group of element groups M01. When the low pass filter process (step S330) is performed on this dot density matrix, the groups group evaluation value (FIG. 17) is calculated. The groups group evaluation value means the evaluation value of each element when it is assumed that the fifth dot is formed for the dither matrix M for which four threshold value storage elements are set. The groups group evaluation values, group evaluation values, and overall evaluation values calculated in this way are used for setting the comprehensive evaluation value.

At step S350, the comprehensive evaluation value setting process is performed. The comprehensive evaluation value setting process is set by applying a specified weighting to the overall evaluation value, the groups group evaluation value, and the group evaluation value and adding. With this embodiment, as one example, the weightings of the overall evaluation value and the group evaluation value are respectively 4, 2, and 1.

FIG. 18 is an explanatory drawing showing the matrix for storing the set comprehensive evaluation value. The comprehensive evaluation value is set as 32 for the row 1, column 3 element, for example. This value is set by adding the value 24 for which 4 which is the weighting value of the value 6 which is the overall evaluation value stored in the row 1, column 3 element of the matrix (FIG. 11) in which the overall evaluation value is stored is multiplied, the value 6 for which 2 which is the weighting value for the value 3 which is the value of the groups group evaluation value stored in the row 1, column 3 element of the matrix (FIG. 17) in which the groups group evaluation value is stored is multiplied, and 2 which is the value of the group evaluation value stored in the row 1, column 3 element of the matrix (FIG. 16) in which the group evaluation value is stored. Note that "Done" is indicated in the two threshold value storage elements.

At step S400 (FIG. 3), the storage element setting process is performed. The storage element setting process is the process of setting the storage element of the focus threshold value (with this example, it is the threshold value for which dots are easily formed eighth). With this embodiment, the storage element is set from among the element for which the comprehensive evaluation value is the smallest. With this example, the row 1, column 1 and the row 7, column 1 elements are candidates of the storage element because they have the same comprehensive evaluation value. The method of selecting from among the two storage element candidates can be based on the findings of trained engineers or can use the method described later.

When this kind of process is performed on all threshold values from the threshold value for which dots are most easily formed to threshold values for which dots are formed with the most difficulty, the dither matrix generating process is completed (step S500).

In this way, the dither matrix generating method of this embodiment is able to generate a dither matrix for which dots formed on print pixels belonging to each of the plurality of first to fourth pixel groups (FIG. 1, FIG. 2) formed almost simultaneously with each main scan are formed by mutually combining in a common print area, and for which optimization is done for the printing device constituted so as to have the physical commonality of the position being relatively accurate between mutual dots of the first and second pixel groups and between mutual dots of the third and fourth pixel groups.

Figure 19:
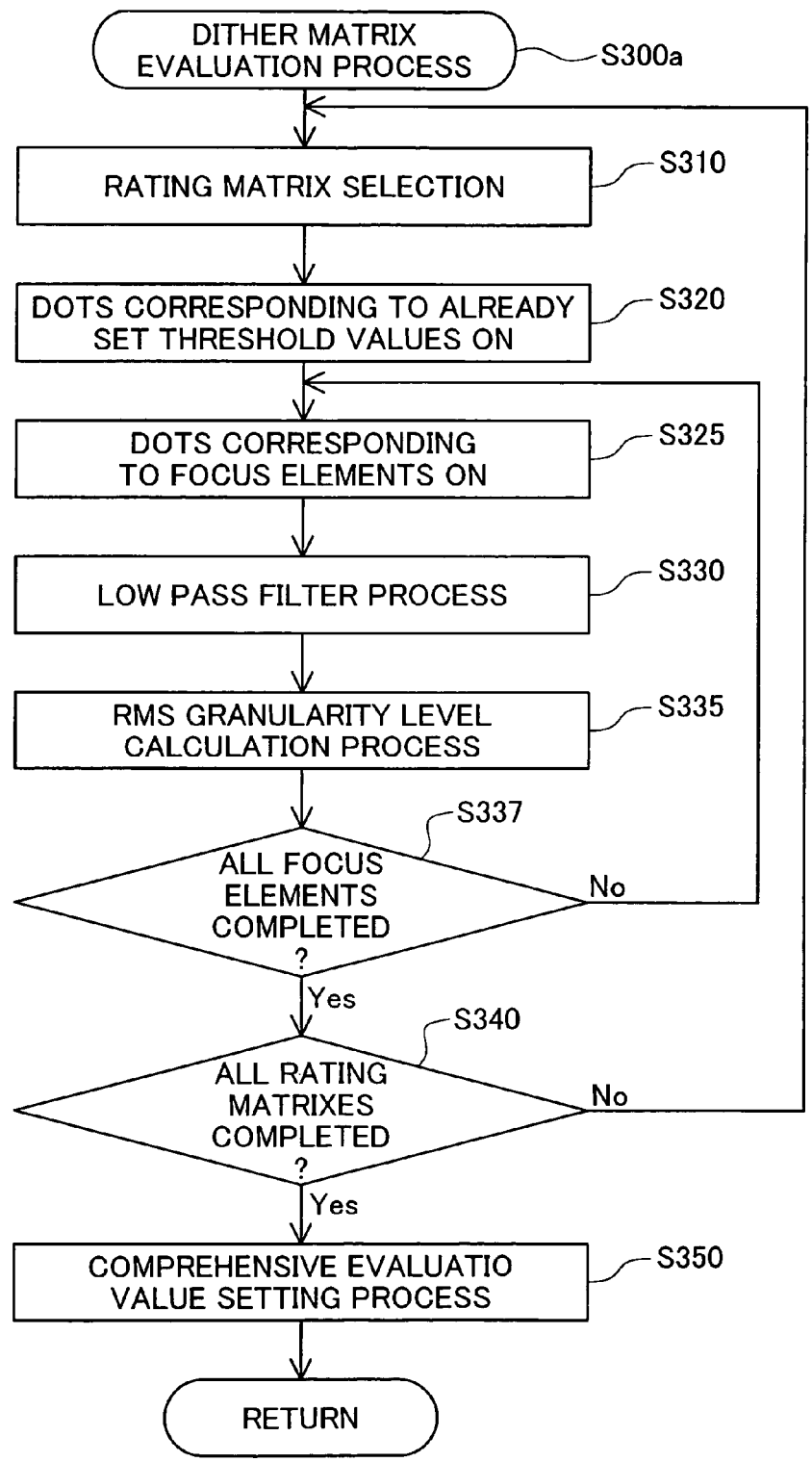
FIG. 19 is a flow chart showing the processing routine of the dither matrix generating method for the second embodiment of the present invention.

C. Dither Matrix Generating Method for the Second Embodiment:

FIG. 19 is a flow chart showing the processing routine of the dither matrix generating method for the second embodiment of the present invention. The generating method of the second embodiment differs from the generating method of the first embodiment in that it assumes that dots are formed at any of the plurality of pixels corresponding to the plurality of candidate elements not already set as the threshold value storage element, specifically, the unset elements, and that the storage elements are set based on the RMS granularity level of the dot pattern formed based on this assumption.

The generating method of the second embodiment can be realized by adding the process of step S325, the process of step S335, and the process of step S337 to the generating method of the second embodiment.

With step S325, the dots of pixels corresponding to the focus element are on. The focus element is one element selected from among a plurality of candidate elements. At step S330, the low pass filter process is performed in the same manner as with the first embodiment.

At step S335, the RMS granularity level calculation process is performed. The RMS granularity level calculation process is the process of calculating the standard deviation after the low pass filter process on the dot density matrix. Calculation of the standard deviation can be performed using the calculation formula in FIG. 20. Note that the calculation of the standard deviation does not absolutely have to be performed for the dot patterns corresponding to all the elements of the dither matrix M, but to reduce the calculation volume, can also be performed using only the dot density of the pixels belonging to a specified window (for example the 5×5 partial matrix). This kind of process is performed for all the focus pixels (step S337).

The values calculated using this kind of process correlate to the overall evaluation value, the group evaluation value, and the groups group evaluation value of the first embodiment. The second embodiment is able to generate an optimal dither matrix by performing evaluation based on the RMS granularity level by handling the calculated overall evaluation value, the group evaluation value, and the groups group evaluation value in the same manner as the first embodiment.

Note that the evaluation method of the second embodiment can also be combined with the evaluation method of the first embodiment. Specifically, it is possible to narrow down the candidate elements of the second embodiment using the evaluation method of the first embodiment, and also to set the storage elements based on the RMS granularity level from the narrowed down candidate elements. For example, with the example shown in the first embodiment, the two element evaluation values are the same, but it is also possible to have these two elements be the candidate elements of the second embodiment. Furthermore, it is also possible to constitute this so that the elements within the specified evaluation value range (for example, an evaluation value difference of 5 or less) be the candidate elements.

D. Variation Examples

Above, several aspects of the present invention were described, but the present invention is in no way limited to these kinds of aspects, and it can be implemented with various aspects within a scope that does not stray from its key points. For example, optimization of a dither matrix is possible for the following kinds of variation examples.

D-1. With the embodiments described above, formation of the print image using four main scans is a prerequisite, but, for example, it is also possible to use the present invention for various constitutions such as a constitution for which the print image is formed with two main scans in the outgoing direction and bidirectionally or a constitution for which a plurality of printing heads are used. Typically, the present invention can be used for which the dots formed on the print pixels belonging to each of the plurality of pixel groups for which physical differences are assumed for the dot formation are mutually combined in a common print area to form the print image, and the plurality of groups includes at least one group of pixel groups having physical commonality for the dot formation. Here, physical commonality can include forming dots using the same printing head, for example, with a constitution that uses a plurality of printing heads.

D-2. With the embodiments described above, to perform calculation of the peripheral part of the dot density matrix, as shown in FIG. 10, the same dot density matrix is placed so as not to be displaced to the periphery, but for example as shown in FIG. 21, it is also possible to displace the matrix for placement.

However, the matrix displacement volume is preferably made so that the group positional relationship does not skew between adjacent dot density matrixes as shown in FIG. 21, for example. This is because by doing this, it is possible to use the same process as the process within a single dot density matrix even with filter processing of a dot density matrix peripheral area that extends across a plurality of dot density matrixes.

D-3. With the embodiments described above, the evaluation criterion is whether or not the plurality of dots formed on pixels corresponding to each element of the matrix overall are formed uniformly for each tone value, but for example, it is also possible to constitute so that the evaluation is done based not on the matrix overall, but only on the plurality of dots formed on the pixels corresponding to each element of part of the matrix.

D-4. With the embodiments described above, together with performing the low pass filter process, the optimality of the dither matrix is evaluated based on the dot density uniformity or RMS granularity level, but, for example, it is also possible to constitute so that together with performing the Fourier transformation on the dot pattern, evaluation of the dither matrix is performed using the VTF function. In specific terms, it is possible to constitute this so that the evaluation scale (Grainess [sic] scale: GS value) used by Dooley et al of Xerox is applied to the dot pattern, and the dither matrix optimality is evaluated using the GS value. Here, the GS value is the granularity evaluation value which can be obtained by performing a specified process including two dimensional Fourier transformation on the dot pattern to do number conversion and by integrating after cascading with the visual spatial frequency characteristic VTF (reference: Fine Imaging and Hard Copies, Corona Co., Society of Photographic Science and Technology of Japan, Imaging Society of Japan, edited by Godo Publishing Committee. p. 534). However, the former has the advantage of complex calculation such as Fourier transformation not being necessary. Note that the GS value is also called the granularity index.

D-5. With the embodiments and variation examples described above, by comparing the threshold value set for the dither matrix and the image data tone value for each pixel, the presence or absence of dot formation is judged for each pixel, but, for example, it is also possible to judge the presence or absence of dot formation by comparing the sum of the threshold value and the tone value with a fixed value. Furthermore, it is also possible to judge the presence or absence of dot formation according to data generated in advance based on the threshold value without directly using the threshold value, and on the tone value. The dither method of the present invention generally is acceptable as long as it judges the presence or absence of dot formation according to the tone value of each pixel and the threshold value set for the corresponding pixel position in the dither matrix.

D-6. With the embodiments and variation examples described above, disclosed is a halftone process using a dither matrix, but it is not absolutely a prerequisite for there to be a dither matrix, and it is acceptable as long as the halftone process of the present invention is constituted so that for each tone value, any of the dot patterns formed on the print pixels belonging to each of the plurality of pixel groups has specified characteristics, and the number of dots formed on the print pixels belonging to each of the plurality of pixel groups is close to equal.

D-7. With the embodiments described above, halftone processing using a dither matrix is performed, but, for example, it is also possible to use the present invention when performing halftone processing using error diffusion. Use of error diffusion can be realized by performing error diffusion processing for each of the plurality of pixel position groups. In specific terms, for the constitutions of the embodiments and variation examples described above, it is possible to realize this by performing halftone processing with individual error diffusion methods for each of the pixel groups belonging to the first to fourth pixel groups.

Finally, the entire disclosure of Japanese Patent Application No. 2005-268996 filed on Sep. 15, 2005 and U.S. patent application Ser. No. 11/350,374, are expressly incorporated by reference herein.

What is claimed is:

1. A printing method of printing on a printing medium, comprising:
a dot data generating step of performing a halftone process on image data representing a input tone value of each of pixels constituting an original image to determine a status of dot formation on each of print pixels of a print image to be formed on the print medium, for generating dot data representing the determined status of dot formation; and
a print image generating step using a printing device to form a dot on each of the print pixels for generating the print image according to the dot data, wherein
the print image generating step includes the step of generating the print image by mutually combining dots formed on print pixels belonging to each of a plurality of pixel groups in a common print area, the plurality of pixel groups having a physical difference each other at the dot formation, the dot formation being performed with respect to each of the pixel groups;
a plurality of pixel groups having a physical commonality for the dot formation among the plurality of pixel groups constitute a pixel group family; and
the halftone process is configured to give specified characteristics to all of a first dot pattern, a second dot pattern, and a third dot pattern, the first dot pattern being formed on print pixels of the print image, the second dot pattern being formed on print pixels belonging to each of the plurality of pixel groups, and the third dot pattern being formed on print pixels belonging to the pixel group family.

2. The printing method according to claim 1, wherein the specified characteristic is a granularity evaluation value.

3. The printing method according to claim 1, wherein the specified characteristic is either one of blue noise characteristics and green noise characteristics.

4. The printing method according to claim 1, wherein the halftone process is constituted based on an evaluation value calculated by multiplying a specified weighting to a print image characteristics, a pixel group characteristics, and a pixel group family characteristics and summing the weighted print image characteristics, the weighted pixel group characteristics, and the weighted pixel group family characteristics, the print image characteristic being the specified characteristic of dot pattern formed on each printing pixel of the printing image, the pixel group characteristics being the specified characteristic of dot pattern formed on the print pixels belonging to each of the plurality of pixel groups, the pixel group family characteristics being the specified characteristic of dot pattern formed on the print pixels belonging to the pixel group family, and
the specified weighting is set such that a first weighting multiplied on the print image characteristics is largest, a second weighting multiplied on the pixel group characteristics is smallest, and the weighting multiplied on the pixel group family characteristics is smaller than the first weighting and the same or greater than the second weighting.

5. The printing method according to claim 1, wherein the print image generating step includes the step of generating the print image by forming dots on each of the print pixels according to the dot data, while performing a main scan of a printing head for ejecting ink for forming dots, with both outgoing movement and return movement of the printing head, and
the pixel group family includes a first pixel group family consisting of a plurality of pixel groups for which dots are formed during the outgoing movement of the printing head, and a second pixel group family consisting of a plurality of pixel groups for which dots are formed during the return movement of the printing head.

6. The printing method according to claim 5, wherein the halftone process is configured such that any of correlation coefficient between any of a first granularity evaluation value, a second granularity evaluation value, and a third granularity evaluation value is 0.7 or greater, the first granularity evaluation value being a granularity evaluation value of dot pattern formed on the print pixels of the print image, the second granularity evaluation value being a granularity evaluation value of dot patterns formed on print pixels belonging to the first pixel group family, the third granularity evaluation value being a granularity evaluation value of dot patterns formed on print pixels belonging to the second pixel group family.

7. The printing method according to claim 5, wherein the halftone process is configured such that any of correlation coefficient between any of a first spatial frequency distribution, a second spatial frequency distribution, and a third spatial frequency distribution is 0.7 or greater, the first spatial frequency distribution being a spatial frequency distribution of dot pattern formed on the print pixels of the print image, the second spatial frequency distribution being a spatial frequency distribution of dot patterns formed on the print pixels belonging to the first pixel group family, the third spatial frequency distribution being a spatial frequency distribution of dot patterns formed on the print pixels belonging to the second pixel group family.

8. A dither matrix method of generating a dither matrix for determining a status of dot formation on each print pixel of a print image to be formed on a printing medium by performing a halftone process on input image data, wherein
the print image is formed by mutually combining dots formed on print pixels belonging to each of a plurality of pixel groups for which a physical difference is assumed with dot formation using the print image generating step, in a common print area, wherein the dither matrix generating method comprises:

a focus threshold value setting step using a printing device, a dither matrix generating device, or a computer, to set a specific threshold value as a focus threshold value from among a plurality of threshold values to be stored in each of elements of the dither matrix, the specific threshold value being for which a storage element is not yet set and for which dot formation turns on most easily among the plurality of threshold values;

a matrix evaluation step of setting a comprehensive evaluation value for each assumption that the focus threshold value is stored in each of blank elements that are elements for which stored threshold values are not yet set, wherein dots are regarded as being formed on the pixels corresponding to already set elements that are elements for which the stored threshold values are already set, a storage element setting step of setting the element for storing the focus threshold value according to the comprehensive evaluation value, and a repetition step of repeating each of the steps from the focus threshold value setting step to the storage element setting step, for at least part of the plurality of threshold values, wherein the matrix evaluation step comprises:

an overall evaluation value setting step of setting an overall evaluation value by evaluating the status of dot formation corresponding to all of the groups of the already set elements, a group evaluation value setting step of setting a group evaluation value by evaluating the status of dot formation corresponding only to elements belonging to a rating group selected from among a plurality of element groups corresponding to the plurality of pixel groups among the already set elements, a group family evaluation value setting step of setting a group family evaluation value by evaluating the status of dot formation corresponding only to elements belonging to an element group family that is a combination of the rating group and an element group having a physical commonality with the rating group for a dot formation, among the plurality of element groups, and a comprehensive evaluation value setting step of setting a comprehensive evaluation value according to the overall evaluation value, the group evaluation value, and the group family evaluation value.

9. The dither matrix generating method according to claim 8, wherein the comprehensive evaluation value setting step includes the step of setting the comprehensive evaluation value by multiplying a specified weighting on the overall evaluation value, the group evaluation value, and the group family evaluation value and summing the weighted overall evaluation value, the weighted group evaluation value, and the weighted group family evaluation value, and the specified weighting is set such that the first weighting multiplied on the overall evaluation value is the largest, the second weighting multiplied on the group evaluation value is smallest, the weighting multiplied on the groups group evaluation value is smaller than the first weighting and the same or greater than the second weighting.

10. A printing apparatus for printing on a printing medium, comprising:

a dot data generator that performs a halftone process on image data representing a input tone value of each of pixels constituting an original image to determine a status of dot formation on each of print pixels of a print image to be formed on the print medium, for generating dot data representing the determined status of dot formation; and a print image generator that forms a dot on each of the print pixels for generating the print image according to the dot data, wherein the print image generator generates the print image by mutually combining dots formed on print pixels belonging to each of a plurality of pixel groups in a common print area, the plurality of pixel groups having a physical difference each other at the dot formation, the dot formation being performed with respect to each of the pixel groups;

a plurality of pixel groups having a physical commonality for the dot formation among the plurality of pixel groups constitute a pixel group family; and the halftone process is configured to give specified characteristics to all of a first dot pattern, a second dot pattern, and a third dot pattern, the first dot pattern being formed on print pixels of the print image, the second dot pattern being formed on print pixels belonging to each of the plurality of pixel groups, and the third dot pattern being formed on print pixels belonging to the pixel group family.

* * * * *